United States Patent
Hsu et al.

(10) Patent No.: US 9,904,853 B2
(45) Date of Patent: Feb. 27, 2018

(54) MONITORING CAMERA DEVICE AND RELATED REGION-BASED MOTION DETECTION METHOD

(71) Applicant: VATICS INC., New Taipei (TW)

(72) Inventors: Te-Wei Hsu, New Taipei (TW); Chao-Chi Yeh, New Taipei (TW)

(73) Assignee: VATICS INC., New Taipei (TW)

( * ) Notice: Subject to any disclaimer, the term of this patent is extended or adjusted under 35 U.S.C. 154(b) by 199 days.

(21) Appl. No.: 14/975,850

(22) Filed: Dec. 20, 2015

(65) Prior Publication Data
US 2017/0084045 A1  Mar. 23, 2017

(30) Foreign Application Priority Data

Sep. 23, 2015 (TW) .............................. 104131359 A

(51) Int. Cl.
*H04N 7/00* (2011.01)
*G06K 9/00* (2006.01)
*G06K 9/62* (2006.01)
*H04N 7/18* (2006.01)
*G06K 9/46* (2006.01)
*G08B 13/196* (2006.01)
*G06T 7/246* (2017.01)

(52) U.S. Cl.
CPC ....... *G06K 9/00771* (2013.01); *G06K 9/4604* (2013.01); *G06K 9/6202* (2013.01); *G06T 7/246* (2017.01); *G08B 13/19604* (2013.01); *H04N 7/183* (2013.01); *G06T 2207/20021* (2013.01); *G06T 2207/20036* (2013.01)

(58) Field of Classification Search
CPC ....... G06T 7/20; G06F 17/30; G06F 17/3079; G06F 17/30811; G06F 17/30858; G06K 9/00342; G06K 9/00711; G06K 9/00771
See application file for complete search history.

(56) References Cited

U.S. PATENT DOCUMENTS

| | | | | |
|---|---|---|---|---|
| 5,574,762 A | * | 11/1996 | Sato | .................... G06K 9/00778 377/10 |
| 6,184,858 B1 | * | 2/2001 | Christian | .............. G01S 3/7865 345/634 |
| 6,424,370 B1 | * | 7/2002 | Courtney | ............ G06F 17/3079 348/135 |
| 7,190,809 B2 | * | 3/2007 | Gutta | ................. G06K 9/00771 348/169 |

(Continued)

FOREIGN PATENT DOCUMENTS

| | | |
|---|---|---|
| TW | 520603 | 2/2003 |
| TW | 200535685 | 11/2005 |

*Primary Examiner* — Frank Huang
(74) *Attorney, Agent, or Firm* — Winston Hsu

(57) ABSTRACT

A region-based motion detection method and a related monitoring camera device are applied to detect an object's motion on a frame. The region-based motion detection method includes dividing a current frame into a plurality of first template arrays, dividing a first reference frame into a plurality of second template arrays, acquiring characteristic values of one of the first template arrays and a corresponding second template array, comparing the characteristic value of the foresaid first template array with the characteristic value of the corresponding second template array by matching process, and executing motion detection of the current frame according to a matching result.

13 Claims, 7 Drawing Sheets

(56) References Cited

U.S. PATENT DOCUMENTS

| | | | |
|---|---|---|---|
| 7,868,912 B2* | 1/2011 | Venetianer | G06F 17/30799 |
| | | | 348/143 |
| 7,880,766 B2* | 2/2011 | Aoki | H04N 7/181 |
| | | | 348/143 |
| 8,964,030 B2 | 2/2015 | Itoh | |
| 2005/0089195 A1* | 4/2005 | Hu | G06T 5/002 |
| | | | 382/107 |
| 2006/0227862 A1* | 10/2006 | Campbell | G06K 9/00778 |
| | | | 375/240 |
| 2008/0100438 A1* | 5/2008 | Marrion | G06K 9/00771 |
| | | | 340/555 |
| 2013/0011042 A1* | 1/2013 | Satish | G06K 9/00 |
| | | | 382/134 |
| 2017/0084045 A1* | 3/2017 | Hsu | G06K 9/6202 |

* cited by examiner

MONITORING CAMERA DEVICE AND RELATED REGION-BASED MOTION DETECTION METHOD

BACKGROUND OF THE INVENTION

1. Field of the Invention

The present invention relates to a monitoring camera device capable of detecting motion of an object, and more particularly, to a monitoring camera device capable of detecting motion of an object and a related region-based motion detection method.

2. Description of the Prior Art

The surveillance apparatus, such as the monitoring camera and the vehicle video recorder, are applied to capture images of the surveillance area. The surveillance apparatus utilizes motion detection technique to find out a moving object within the image to automatically determine whether abnormality happens in the surveillance area, and executes related application program according to characteristics of the moving object. The conventional motion detection technique acquires the current frame and the previous and following frames (which are related to the foresaid current frame) while the surveillance apparatus is actuated, compares pixel values of corresponding positions on the current frame and the previous and following frames with a threshold to determine information of the moving object within the current frame; the conventional motion detection technique mentioned above has to analyze a larger number of data by expensive hardware, and has low noise reduction ability. Another conventional motion detection technique acquires the reference frame at a specific time, and then the current frame acquired afterward is applied to the motion detection by criterion of the reference frame; in this conventional motion detection technique, an interval of capturing time between the reference frame and the current frame may be large, and complicated reference frame updating scheme results in difficulty of the motion detection.

SUMMARY OF THE INVENTION

The present invention provides a monitoring camera device capable of detecting motion of an object and a related region-based motion detection method for solving above drawbacks.

According to the claimed invention, a region-based motion detection method capable of detecting motion of an object displayed on a frame is disclosed. The region-based motion detection method includes dividing a current frame into a plurality of first template arrays, dividing a first reference frame into a plurality of second template arrays, acquiring characteristic values of one of the plurality of first template arrays and a corresponding second template array of the plurality of second template arrays, comparing the characteristic value of the foresaid first template array with the characteristic value of the corresponding second template array by matching process, and executing motion detection of the object displayed on the current frame according to a result of the matching process.

According to the claimed invention, the region-based motion detection method further includes detecting noise level of the current frame, and deciding array parameters of the plurality of first template arrays and the plurality of second template arrays according to the noise level.

According to the claimed invention, the region-based motion detection method further includes transforming the characteristic values by grouping process while the matching process is finished, wherein the region-based motion detection method utilizes the characteristic values transformed by the grouping process to execute the motion detection of the current frame.

According to the claimed invention, the region-based motion detection method further includes acquiring a plurality of weighted values according to a result of the motion detection, applying the plurality of weighted values to the current frame and the first reference frame to generate a second reference frame, and replacing the first reference frame by the second reference frame for next motion detection.

According to the claimed invention, a monitoring camera device includes a frame capturing unit and an operation processing unit. The frame capturing unit is adapted to capture a reference frame and a current frame respectively in different time. The operation processing unit is electrically connected to the frame capturing unit and adapted to execute a region-based motion detection method of dividing the current frame into a plurality of first template arrays, dividing the reference frame into a plurality of second template arrays, acquiring characteristic values of one of the plurality of first template arrays and a corresponding second template array of the plurality of second template arrays, comparing the characteristic value of the foresaid first template array with the characteristic value of the corresponding second template array by matching process, and executing motion detection of an object displayed on the current frame according to a result of the matching process.

The monitoring camera device and the related region-based motion detection method of the present invention detects the noise level of the current frame in the beginning, and utilizes detection result of the noise level to decide parameters of the template arrays; for instance, dimensions of the template array is large as quantity of the noise level is increased, so the noise reduction ability is strengthened to prevent erroneous motion detection. The region-based motion detection method determines the template arrays of the current frame and the reference frame, and executes the matching process and the grouping process through each template array to acquire the result of the motion detection; the region-based motion detection method further utilizes the motion-adaptive update scheme to reset the reference frame according to variation of the weighted values, so as to eliminate the ghost appeared in the frame for preferred detection accuracy.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
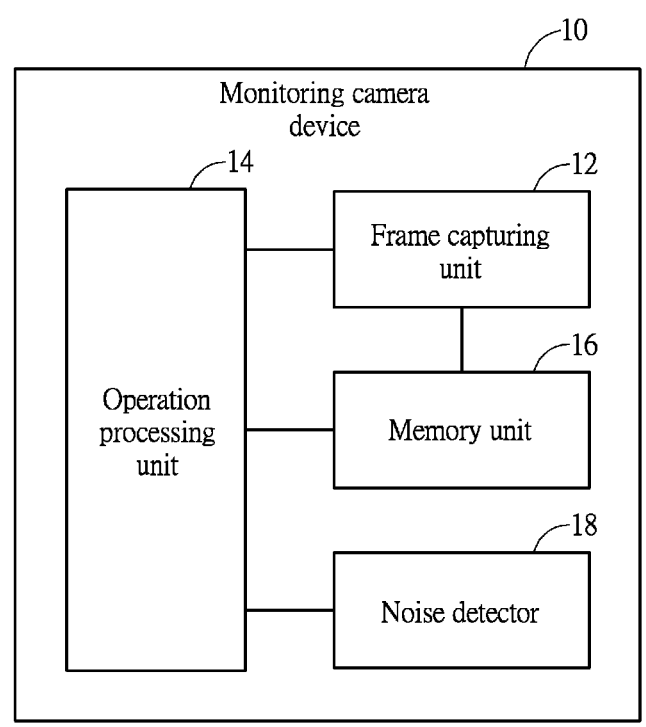
FIG. 1 is a functional block diagram of a monitoring camera device according to an embodiment of the present invention.
Figure 2:
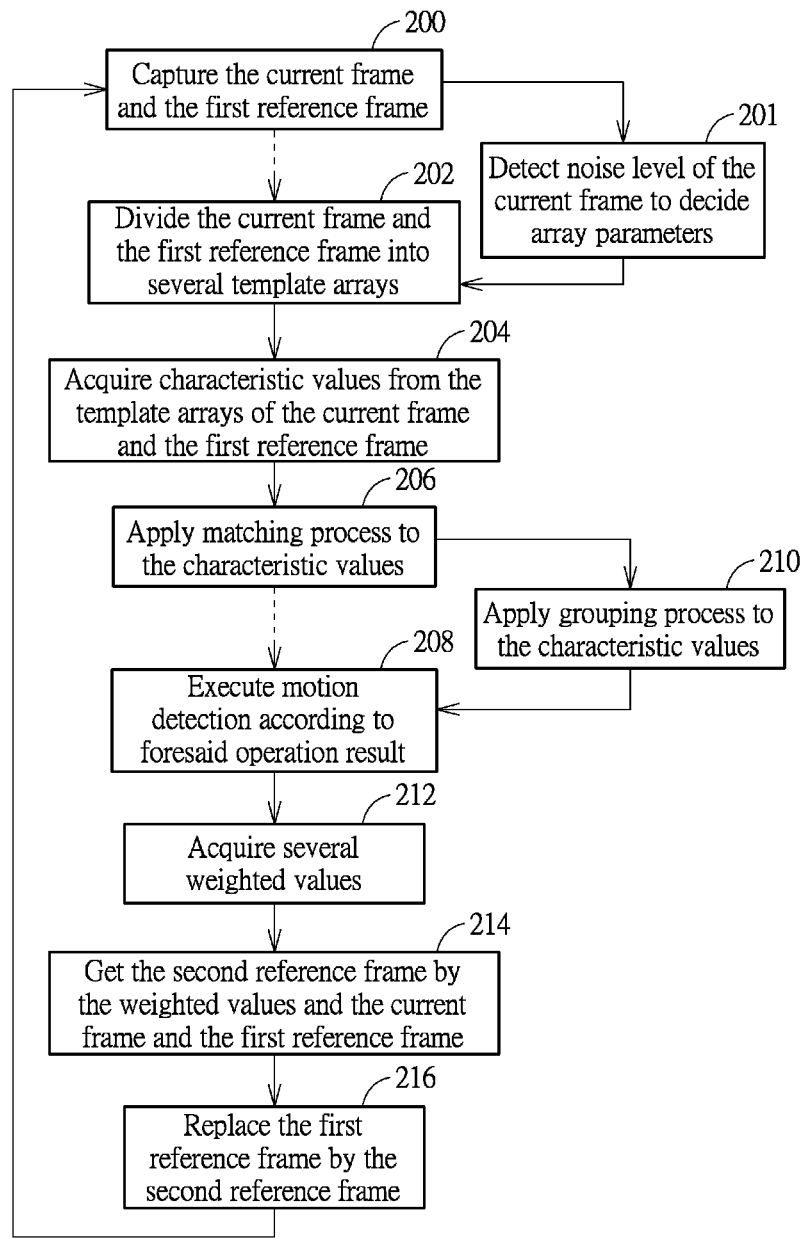
FIG. 2 is a flowchart of a region-based motion detection method according to the embodiment of the present invention.
Figure 3:
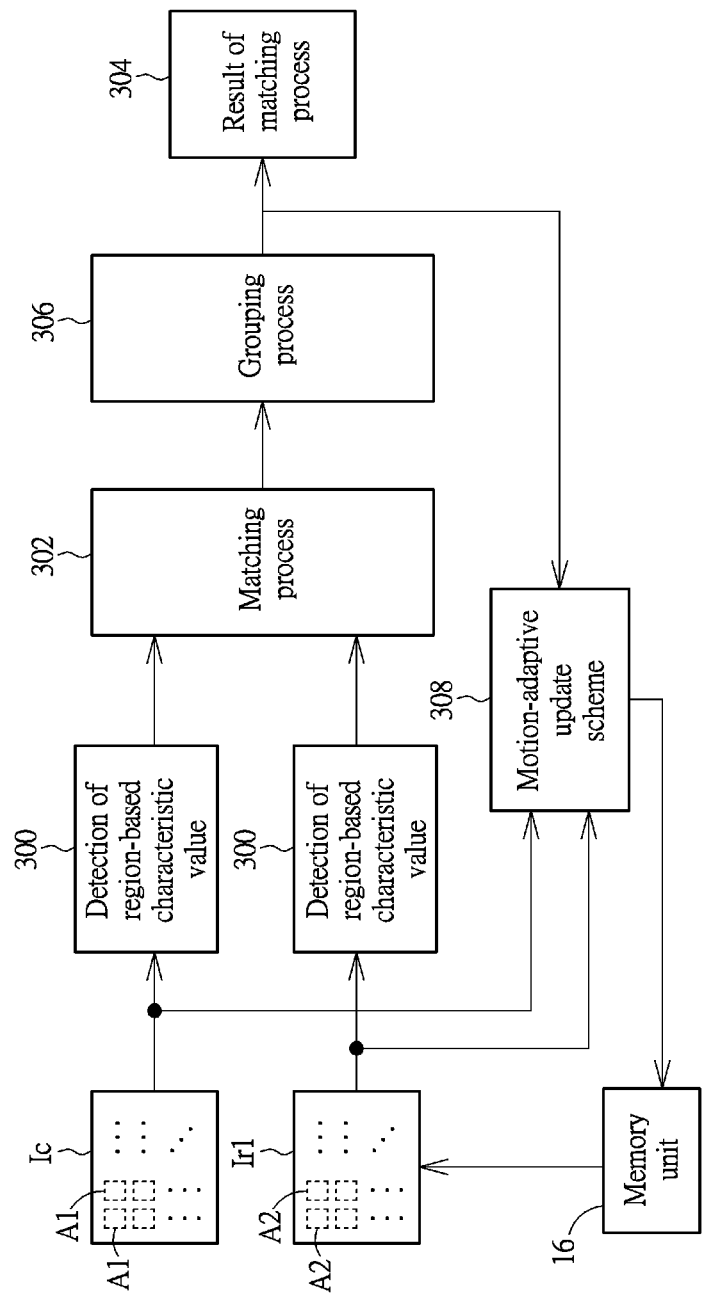
FIG. 3 is functional diagram of the region-based motion detection method according to the embodiment of the present invention.

Please refer to FIG. 1 to FIG. 3. FIG. 1 is a functional block diagram of a monitoring camera device 10 according to an embodiment of the present invention. FIG. 2 is a flow chart of a region-based motion detection method according to the embodiment of the present invention. FIG. 3 is functional diagram of the region-based motion detection method according to the embodiment of the present invention. The monitoring camera device 10 can detect motion of an object displayed on a frame. The monitoring camera device 10 includes a frame capturing unit 12, an operation processing unit 14 and a memory unit 16 electrically connected with each other. The frame capturing unit 12 can capture a reference frame and a current frame respectively in different time, the operation processing unit 14 utilizes the reference frame and the current frame to execute the region-based motion detection method illustrated in FIG. 2, the region-based motion detection method acquires and stores information of the current frame into the memory unit 16, and the reference frame can be updated according to variations of characteristic values of the reference frame and the current frame, so as to keep preferred detection accuracy and further to effectively eliminate fragment (such like burn-in ghost) on the frame.

The region-based motion detection method of the present invention is a motion-adaptive frame detection technique similar to infinite impulse response (IIR) filter, which executes signal processing by skill of recursive temporal frame. Due to the skill of recursive temporal frame, the reference frame can be automatically updated by the previous reference frame and the current frame while time passed. Each of the reference frame is with relation to the characteristic values of the current frame and the previous reference frame (which represents the past and former reference frame), so as to obviously increase accuracy of the region-based motion detection method.

As the region-based motion detection method illustrated in FIG. 2, step 200 is executed to capture the first reference frame Ir1, and further to capture the current frame Ic according to time variation. Then, step 202 is executed to divide the current frame Ic and the first reference frame Ir1 respectively into a plurality of first template arrays A1 and a plurality of second template arrays A2. The foresaid first template array A1 and the second template array A2 have the same array parameter; for example, the template arrays A1, A2 can be the M*N matrix optionally. Steps 204 and 206 are executed to acquire the characteristic value of one of the plurality of first template arrays A1 and further to acquire the characteristic value of a corresponding second template array A2 form the plurality of second template arrays A2, and then apply matching process to the characteristic values, which can be defined as the functional block 300 (detection of the region-based characteristic value) and the functional block 302 (the matching process) shown in FIG. 3. Final, step 208 is executed to actuate the motion detection of the object displayed on the current frame Ic according to a result of the matching process by the foresaid characteristic values, which can be defined as the functional block 304 (the result of the matching process) shown in FIG. 3, and an area where on the template arrays are disposed can be determined as the kinetic moving area while difference of the characteristic values is greater than a threshold.

Step 204 is utilized to acquire the characteristic values of the template arrays A1, A2 for the matching process, so that the result of the motion detection can have preferred noise reduction effect. The acquired characteristic values can be selected from a group consisting of an edge value, a chroma value, a datum variation value, a brightness value, a saturation value, and combination thereof. Step 206 is utilized to optionally acquire a maximum value, a mean value and/or a weight value of the foresaid characteristic values while the matching process is executed, and to obtain the final value by value variation and/or phase variation of the characteristic values for the motion detection in step 208. Calculation and application of the characteristic value are not limited to the above-mentioned embodiments, which depends on actual demand. For instance, step 204 may calculate and set an amount of the edge value as the characteristic value, or perform any function applied by the foresaid characteristic values to calculate the final value utilized in step 208.

For increasing accuracy of the region-based motion detection method, the monitoring camera device 10 may optionally execute step 201 between steps 200 and 202, and step 201 is utilized to detect noise level of the current frame Ic and further to decide array parameters of the plurality of first template arrays A1 (and the plurality of second template arrays A2) according to the noise level. The array parameters of the first template array A1 and the second template array A2 are identical with each other preferably, but the template arrays A1, A2 still can be different from each other according to design demand. Generally, while dimensions of the template array (which can be represented as the array parameter) is large, the noise level is magnified to increase the noise reduction effect, so as to effectively prevent error of the motion detection.

Figure 4:
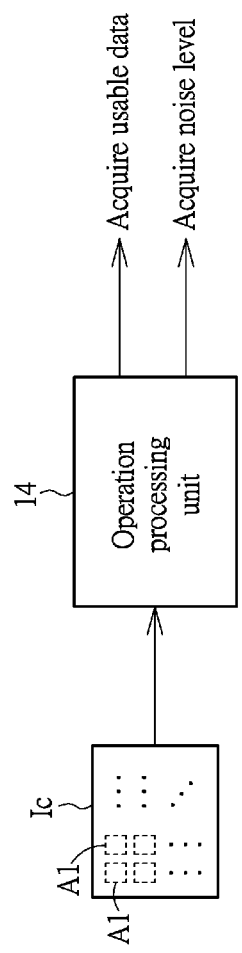
FIG. 4 and FIG. 5 are diagrams of the noise level detection according to different embodiments of the present invention.
Figure 5:
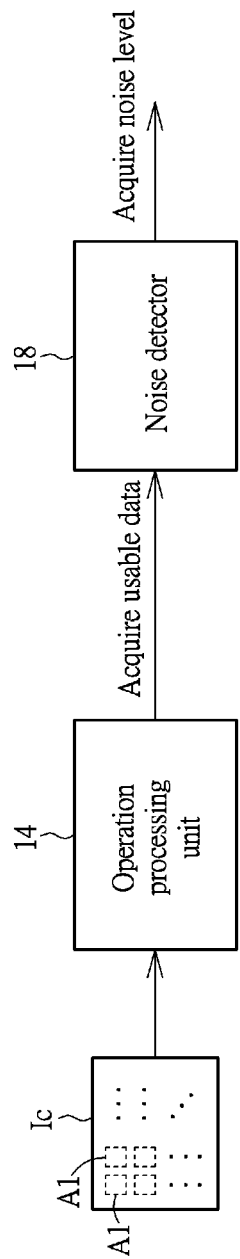

Detection of the noise level can be executed by physical apparatus, or can be accomplished by image processing procedure. Please refer to FIG. 4 and FIG. 5. FIG. 4 and FIG. 5 are diagrams of the noise level detection according to different embodiments of the present invention. As shown in FIG. 4, the usable data and the noise level can be extracted from the current frame Ic by the operation processing unit 14. As shown in FIG. 5, the operation processing unit merely takes out the usable data, such as the foresaid characteristic values, from the current frame Ic, and a noise detector 18 is additionally utilized to take out the noise level from the usable data; for example, the noise detector 18 can acquire the noise level by compiling the noise amount of specific pixel values. The noise level detection is not limited to the above-mentioned embodiments, and a detailed description is omitted herein for simplicity.

Figure 6:
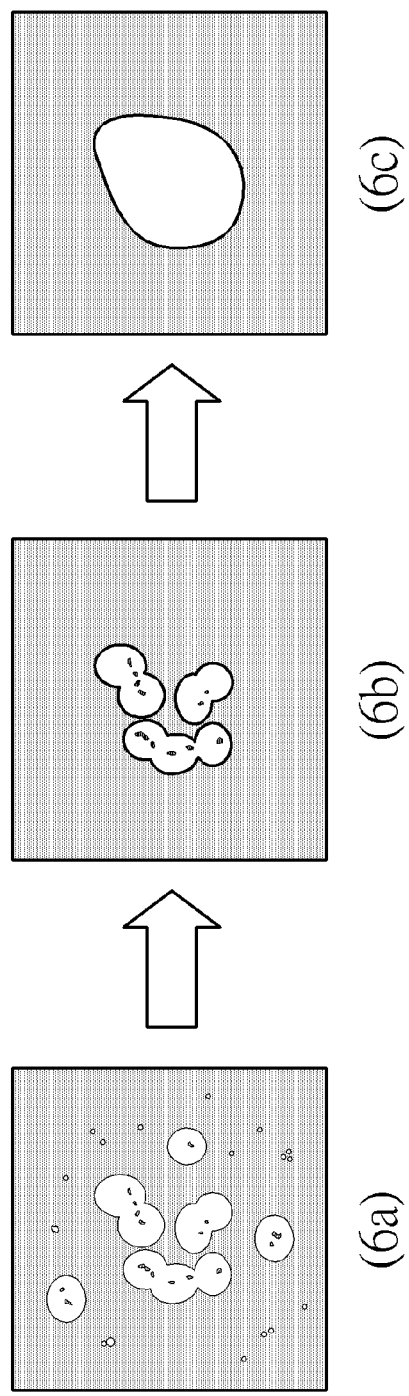
FIG. 6 is a diagram of the grouping process according to the embodiment of the present invention.

Moreover, the region-based motion detection method of the present invention can optionally provide skill of grouping process illustrated in step 210 and skill of motion-adaptive update scheme illustrated between steps 212~216. Step 210 executes the grouping process while step 206 finishes the matching process of the characteristic values (or the grouping process in step 210 may be executed before the matching process in step 206), and then the region-based motion detection method utilizes the characteristic value transformed by the grouping process to execute the motion detection of the current frame Ic. The grouping process may eliminate noise from the characteristic values by erosion calculation and dilation calculation of morphology, or apply the low-pass filter, the median filter and/or the maximum filter for execution of the grouping process in the present invention. Please refer to FIG. 6. FIG. 6 is a diagram of the grouping process according to the embodiment of the present invention. The grouping process is further illustrated as the functional block 306 in FIG. 3. Because the characteristic values of the current frame Ic and the first reference frame Ir1 are similar, the characteristic values can be eroded to eliminate the noise (which can be shown in FIG. 6a to FIG. 6b) and then be dilated for recovery (which can be shown in FIG. 6b to FIG. 6c). Therefore, void regions on the frame can be repaired for noise elimination and strength improvement.

The motion-adaptive update scheme corresponds to the functional block 308 illustrated in FIG. 3. First, step 212 is executed to acquire a plurality of weighted values α and β according to the result of the motion detection, such as acquiring the weighted values by lookup table technique or curve mapping technique. Then, step 214 is executed to apply the first weighted value α onto the current frame Ic (such as obtaining a product of the first weighted value α and the current frame Ic), apply the second weighted value β onto the first reference frame Ir1 (such as obtaining another product of the second weighted value β and the first reference frame Ir1), and then add the foresaid products to get the second reference frame Ir2. Final, step 216 is executed to replace the first reference frame Ir1 by the second reference frame Ir2 for next motion detection. It should be mentioned that the weighted values α and β can be varied according to the result of the motion detection. For example, while an object movement within the current frame Ic is not large, the first weighted value α is designed as a small value and the second weighted value β is designed as a large value while the second reference frame Ir2 is updated; while the object movement within the current frame Ic is greater, the first weighted value α is designed as the large value and the second weighted value β is designed as the small value accordingly. A sum of the first weighted value α and the second weighted value β equals 100%. That is, the region-based motion detection method of the present invention can effectively avoid the fragment (such like the ghost) appeared in the frame due to kinetic random adjustment of the weighted values.

Figure 7:
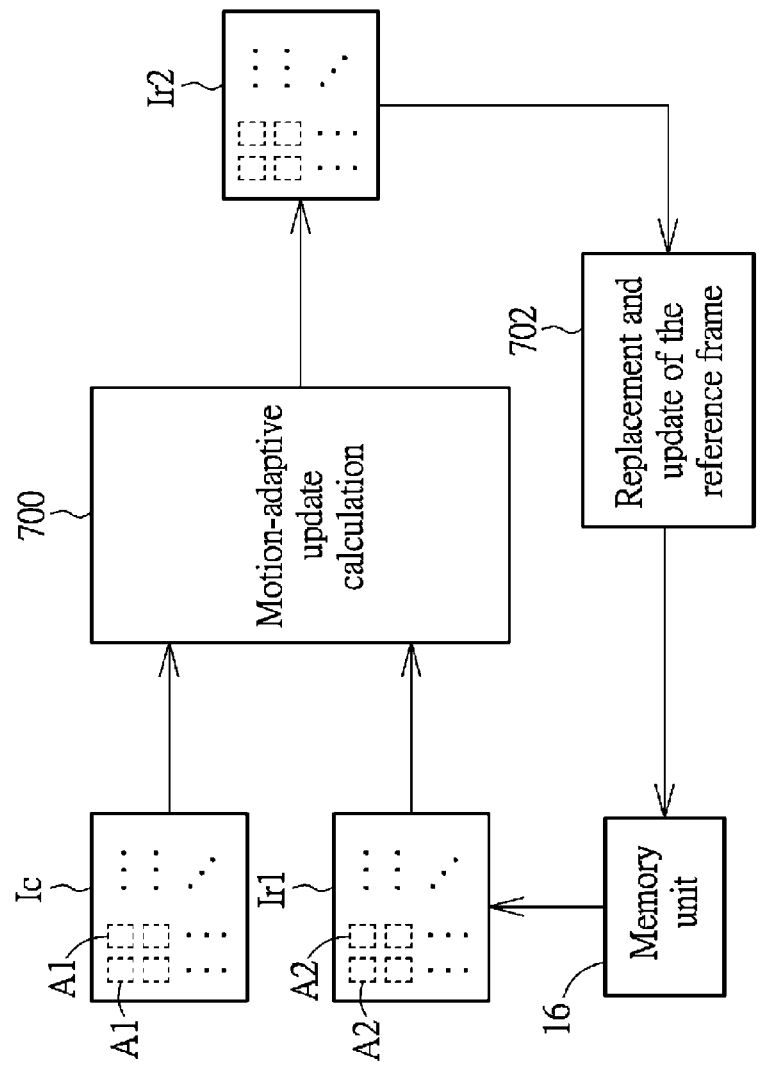
FIG. 7 is a functional diagram of the motion-adaptive update scheme according to the embodiment of the present invention.

Please refer to FIG. 7. FIG. 7 is a functional diagram of the motion-adaptive update scheme illustrated in steps 212~216. The region-based motion detection method of the present invention can apply motion-adaptive update calculation (such as the functional block 700) to the current frame Ic and the first reference frame Ir1 to generate a second reference frame Ir2, and the previous first reference frame Ir1 can be replaced by the second reference frame Ir2 (such as the functional block 702). In case the region-based motion detection method does not execute the motion-adaptive update scheme, the weighted values α and β still are adjustable according to whole region adjustment of the current frame and the reference frame. In case the region-based motion detection method executes the motion-adaptive update scheme, the weighted values α and β still are varied according to the region-based motion detection of the current frame and the reference frame for preferred frame adjustment.

Comparing to the prior art, the monitoring camera device and the related region-based motion detection method of the present invention detects the noise level of the current frame in the beginning, and utilizes detection result of the noise level to decide parameters of the template arrays; for instance, dimensions of the template array is large as quantity of the noise level is increased, so the noise reduction ability is strengthened to prevent erroneous motion detection. The region-based motion detection method determines the template arrays of the current frame and the reference frame, and executes the matching process and the grouping process through each template array to acquire the result of the motion detection; the region-based motion detection method further utilizes the motion-adaptive update scheme to reset the reference frame according to variation of the weighted values, so as to eliminate the ghost appeared in the frame for preferred detection accuracy.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A region-based motion detection method capable of detecting motion of an object displayed on a frame, the region-based motion detection method comprising:
    detecting noise level of a current frame;
    deciding array parameters of template arrays according to the noise level;
    dividing the current frame into a plurality of first template arrays according to the array parameters;
    dividing a first reference frame into a plurality of second template arrays according to the array parameters;
    acquiring characteristic values of one of the plurality of first template arrays and a corresponding second template array of the plurality of second template arrays;
    comparing the characteristic value of the foresaid first template array with the characteristic value of the corresponding second template array by matching process; and
    executing motion detection of the object displayed on the current frame according to a result of the matching process.

2. The region-based motion detection method of claim 1, wherein the characteristic value is selected from a group consisting of an edge value, a chroma value, a datum variation value, a brightness value, a saturation value, and combination thereof.

3. The region-based motion detection method of claim 2, wherein the matching process optionally acquires a maximum value, a mean value and/or a weight value of the characteristic values for the motion detection.

4. The region-based motion detection method of claim 1, wherein the matching process utilizes value variation and/or phase variation of the characteristic values for the motion detection.

5. The region-based motion detection method of claim 1, wherein the array parameters are increased while the noise level is magnified.

6. The region-based motion detection method of claim 1, further comprising:
    transforming the characteristic values by grouping process while the matching process is finished, wherein the region-based motion detection method utilizes the characteristic values transformed by the grouping process to execute the motion detection of the current frame.

7. The region-based motion detection method of claim 6, wherein a step of transforming the characteristic values by the grouping process while the matching process is finished comprises: utilizing erosion calculation and dilation calculation of morphology to eliminate noise from the characteristic value.

8. The region-based motion detection method of claim 6, wherein low-pass filter, median filter and/or maximum filter is utilized to execute the grouping process.

9. The region-based motion detection method of claim 1, further comprising:
   acquiring a plurality of weighted values according to a result of the motion detection;
   applying the plurality of weighted values to the current frame and the first reference frame to generate a second reference frame; and
   replacing the first reference frame by the second reference frame for next motion detection.

10. The region-based motion detection method of claim 9, wherein the plurality of weighted values comprise a first weighted value and a second weighted value varied according to the result of the motion detection, a product of the first weighted value and the current frame and a product of the second weighted value and the first reference frame are added to get the second reference frame.

11. The region-based motion detection method of claim 10, wherein the second weighted value is increased while an object motion on the current frame is decreased, and a sum of the first weighted value and the second weighted value equals 100%.

12. The region-based motion detection method of claim 9, wherein a step of acquiring the plurality of weighted values according to the result of the motion detection comprises: acquiring the plurality of weighted values by lookup table technique and/or curve mapping technique.

13. A monitoring camera device, comprising:
   a frame capturing unit adapted to capture a reference frame and a current frame respectively in different time; and
   an operation processing unit electrically connected to the frame capturing unit and adapted to execute a region-based motion detection method of detecting noise level of the current frame, deciding array parameters of template arrays according to the noise level, dividing the current frame into a plurality of first template arrays according to the array parameters, dividing the reference frame into a plurality of second template arrays according to the array parameters, acquiring characteristic values of one of the plurality of first template arrays and a corresponding second template array of the plurality of second template arrays, comparing the characteristic value of the foresaid first template array with the characteristic value of the corresponding second template array by matching process, and executing motion detection of an object displayed on the current frame according to a result of the matching process.

* * * * *